United States Patent [19]

Brockman et al.

[11] Patent Number: 5,553,424
[45] Date of Patent: Sep. 10, 1996

[54] STORAGE TERMINAL SHELTER INCLUDING SIDE CURTAIN AND HEAD BAG ASSEMBLIES FOR TRUCK/TRAILER HINGE GAP AND ROOF CLOSURE

[75] Inventors: Thomas R. Brockman, Kenton; Mark Dillon, Upper Sandusky, both of Ohio

[73] Assignee: Berwick Industries, Inc., Upper Sandusky, Ohio

[21] Appl. No.: 355,133

[22] Filed: Dec. 13, 1994

[51] Int. Cl.[6] ............................................. E04H 14/00
[52] U.S. Cl. ........................... 52/2.12; 52/173.2; 49/504
[58] Field of Search ................................. 52/173.2, 2.12, 52/2.13, 2.14; 49/504; 160/181, 124

[56] References Cited

U.S. PATENT DOCUMENTS

| | | | |
|---|---|---|---|
| 3,792,559 | 2/1974 | Frommelt et al. | 52/287.1 X |
| 3,875,954 | 4/1975 | Frommelt et al. | 52/173.2 X |
| 3,994,103 | 11/1976 | Ouellet | 52/173.2 X |
| 4,349,992 | 9/1982 | Layne | 52/173.2 |
| 4,638,612 | 1/1987 | Bennett . | |
| 4,711,059 | 12/1987 | Layne . | |
| 4,750,299 | 6/1988 | Frommelt et al. | 52/2.13 |
| 4,805,362 | 2/1989 | Frommelt et al. . | |
| 4,821,468 | 4/1989 | Moore | 52/2.13 |
| 5,007,211 | 4/1991 | Ouellet | 52/2.12 |
| 5,048,246 | 9/1991 | Sullivan | 52/173.2 |
| 5,185,977 | 2/1993 | Brockman et al. . | |
| 5,282,342 | 2/1994 | Brockman et al. . | |
| 5,341,613 | 8/1994 | Brockman et al. | 52/173.2 |
| 5,345,733 | 9/1994 | Brockman et al. | 52/173.2 |
| 5,394,662 | 3/1995 | Giuliani et al. | 52/173.2 |
| 5,442,825 | 8/1995 | Hahn et al. | 52/173.2 X |
| 5,473,846 | 12/1995 | Giuliani et al. | 52/2.12 X |

FOREIGN PATENT DOCUMENTS 2436518  8/1975  Germany ........................ 52/173.2

OTHER PUBLICATIONS

"Super Seal Dock Seals", Super Seal Mfg. Ltd. Brochure Aug. 1989 . . . 52/173.2.

Primary Examiner—Carl D. Friedman
Assistant Examiner—Laura A. Saladino
Attorney, Agent, or Firm—David H. Semmes

[57] ABSTRACT

A vehicular loading dock shelter with opposed hinge gap and head bag closures. For the hinge gap closures, reinforced side curtains seal corner hinge areas, as a truck/trailer is backed into the loading dock, to thereby form a protective weather seal for the sides of the dock. Excessive pull on opposed side curtains is compensated by a pair of single leaf spring-loaded hinge assemblies, connecting the respective curtains to corresponding shelter side frames of the front walls. These hinge gap closures having side curtains for are each adapted to set the side curtains parallel to the door of the dock in the normal closed position, when the dock is not in use. When a trailer is backed into the dock, reverse mobility of the vehicle causes the side curtains to forcibly deflect from their normal aligned and inoperative position, to extend them along the inside of respective trailer swing doors when open; whereupon a collapsible tubular wedge on the extreme end of each side curtain encompasses and plugs the dock side gaps, created by the truck and its swing doors. This assemblage is effective preparatory to and during loading and off-loading. An inflatable head bag completes the seal against the top of a docked truck/trailer after docking. The overall effect is to seal the open vehicle on at least the top and sides thereof. Supplemental seals may be incorporated at the bottom of the shelter to compensate for any gap that may be created adjacent the tailgate of the vehicle.

3 Claims, 4 Drawing Sheets

STORAGE TERMINAL SHELTER INCLUDING SIDE CURTAIN AND HEAD BAG ASSEMBLIES FOR TRUCK/TRAILER HINGE GAP AND ROOF CLOSURE

CROSS REFERENCE TO RELATED APPLICATIONS

This invention is related to that which is defined in U.S. Pat. No. 5,185,977, dated Feb. 16, 1993; inventors, Thomas R. Brockman and Mark Dillon; entitled: STORAGE TERMINAL SHELTER, INCLUDING SIDE CURTAIN ASSEMBLY FOR TRUCK/TRAILER HINGE GAP CLOSURE. It is based upon patent application Ser. No. 07/994,747, filed Dec. 22, 1992, now U.S. Pat. No. 5,341,613 and Continuation-in-Part of patent application Ser. No. 8/086,259, filed Jul. 6, 1993, now abandoned each of the same title: STORAGE TERMINAL SHELTER, INCLUDING SIDE CURTAIN AND HEAD BAG ASSEMBLIES FOR TRUCK/TRAILER HINGE GAP AND ROOF CLOSURE, and same inventors.

BACKGROUND OF THE INVENTION

In the loading and off-loading of trucks, more specifically, tractor-trailer trucks, it is desirable to seal the area between terminal dock and/or shelter against inclement weather. At the same time, it is important to provide such a combined dock seal and shelter as will be able to withstand substantial vehicular abuse. Accordingly, the present invention is adapted to provide at a given warehouse or building dock, a protective unit that presents a weather-tight seal when deflected by trailer or truck, wherein its rear doors are open and folded back along the sides of the truck and/or trailer. It is desirable that such a dock shelter not only permit complete and unobstructed trailer access, but also provide outstanding weather protection. The shelter herein is mounted along the outer perimeter of the door opening of the warehouse or terminal building. It is imperative that such a shelter permit free access to the truck door opening and that a truck/trailer hinge gap closure be closed upon its sides during loading and unloading. Likewise, the vehicle should be sealable by a head curtain within the shelter. More specifically, the invention is a hinge gap closure unit which may be retrofitted to existing storage shelters in truck/trailer loading and off-loading. The unit is sufficiently versatile to accommodate a truck trailer which is out of position relative to a dock center as defined by the building construction. The dock center is determined by bumpers and dock sills which are operatively disposed, adjacent the door opening of the building.

DISCUSSION OF THE PRIOR ART

There follows a listing of the patented art as it relates to the side curtain assembly for trailer hinge gap closure of this invention:

| BENNETT | 1/27/87 | Pat. No. 4,638,612 |
|---|---|---|
| LAYNE | 12/08/87 | Pat. No. 4,711,059 |
| FROMMELT | 2/21/89 | Pat. No. 4,805,362 |
| BROCKMAN et al | 2/16/93 | Pat. No. 5,185,977 |

In none of the aforecited patents is the combination of applicant's shelter with hinge gap closure and head bag closure shown or described. The following description, drawings and claims define the distinctive coactive relationship of key elements of the invention.

SUMMARY OF THE INVENTION

Every time one opens a warehouse loading door to gain access to a tractor trailer, there is a transfer of inside and outside air that causes building energy loss. With an open, unsealed 8'×8' loading door, this may currently cost some thousands of dollars a year per door in heating energy loss and in excess of a thousand dollars a year per door in air conditioning energy loss. (Research reported by Plant Engineering, May 1984.) The present form fitting dock seal units are fitted to existing shelters to present an effective barrier between the two listed environments, while permitting materials handling personnel unobstructed access to the trailer and its contents.

This is a loading dock shelter with hinge gap closure elements wherein reinforced side assemblies seal corner/hinge areas, as a trailer is backed into a loading dock, to thereby form a protective weather seal. Excessive pull on the side curtains is compensated for by a pair of opposed spring-loaded gap fill assemblies, connected to existing shelter side frames. The present hinge gap closures, having cantilevered side assemblies for right and left portions of the shelter, are each adapted to be set parallel to the upright door jam of the dock in the normal position, when the dock is not in use, thereby protecting the door as indicated. When in use, that is to say, when the trailer is in the dock, the reverse mobility of the truck/trailer causes the assemblies to be deflected from normal inoperative position, and to extend them along the sides of the open trailer swing doors, whereby the assemblies fill left and right gaps created by the truck and its swing doors, preparatory to and during loading and off-loading. To effect these functions, a spring loaded hinge functions to close in extension of the side frame of the shelter when not in use and when in use to be moved arcuately inward from the side frame of the shelter toward the trailer body and its swing doors. Its attached side curtain is thus extended inwardly toward the door, to seal the gap between trailer and shelter. The side curtain assemblies move from substantially rigid side frames of the shelter to operative position, to fill all exposed portions of the gaps between the terminus of the side curtain and the side frames of the shelter. Left and right side assemblies are independently moveable. Thus a complete seal is presented as between the trailer which may or may not be centered in the dock. A head bag sealing assembly coacts, after docking, to complete the sealing function of the shelter.

DESCRIPTION OF THE PREFERRED EMBODIMENTS

A conventional truck terminal building usually defines on its walls multiple doors with appropriate vehicle bumpers set below the dock. Whereas, existing shelter side frames often project right and left of the door, at the dock, the building door may have no side frames and the door opening may simply comprise a loading-unloading cavity in the wall. It is to all such buildings that the present invention applies.

Figure 1:
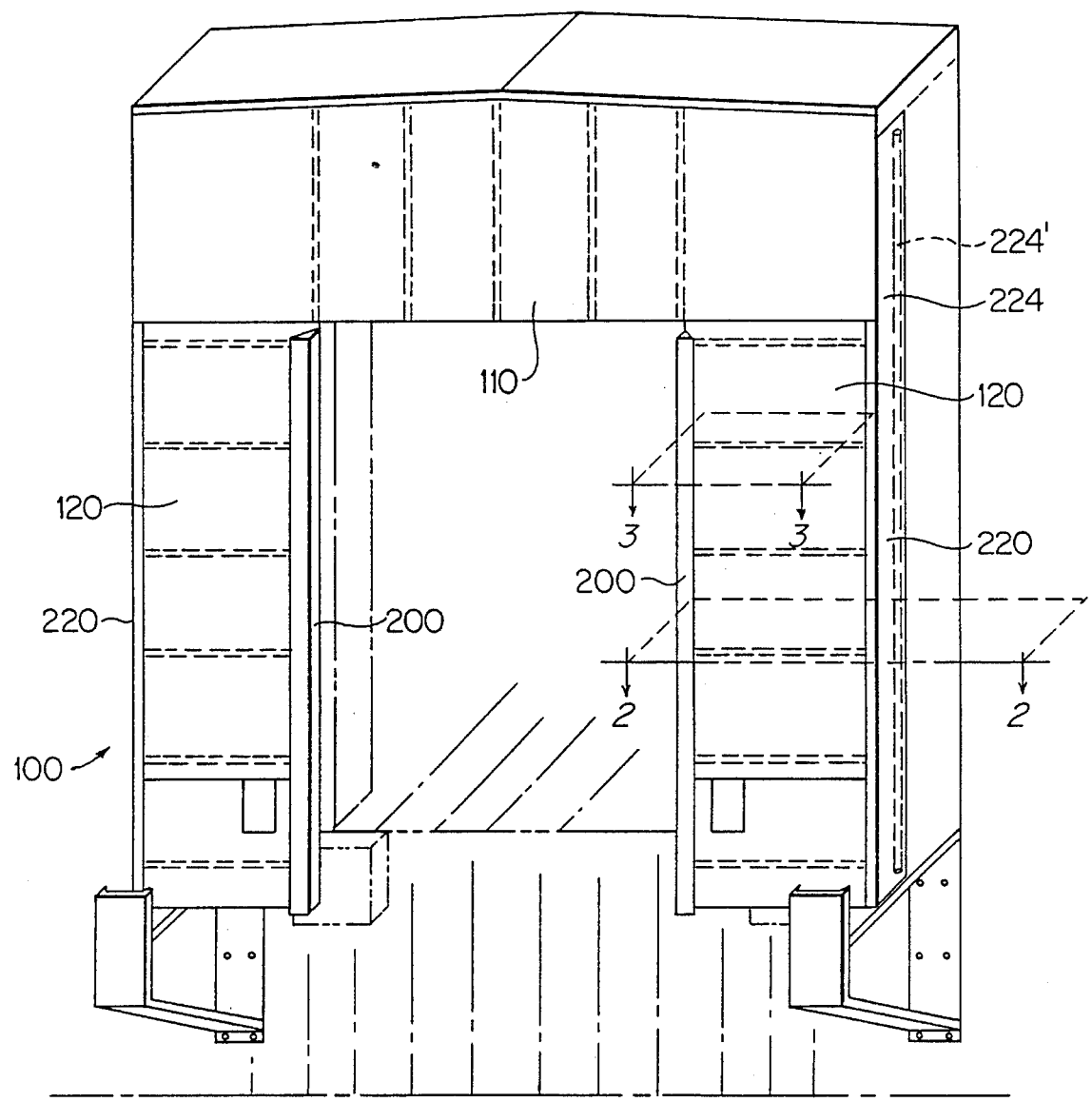
FIG. 1 is a view in perspective of a prior art dock shelter with hinge gap closures. Its counterpart, representing the present invention is represented in FIG. 5, hereinafter.

Shelter 100 of FIG. 1 comprises a prior art dock shelter, its coactive elements having been defined in our patent application Ser. No. 994,747, U.S. Pat. No. 5,341,613 aforesaid. Protruding from the shelter is a reinforced head curtain 110 with opposed side curtain assemblies 200, the side curtains being secured to shelter side frames 150. The unit of the prior art shelter is, as indicated, substantially greater in lateral and vertical dimension than the door of the building, its dock closure assemblies 200 being building supported. Characteristically, the overall height of the shelter is thus substantially greater than the building door and the shelter units project from the building.

Figure 2:
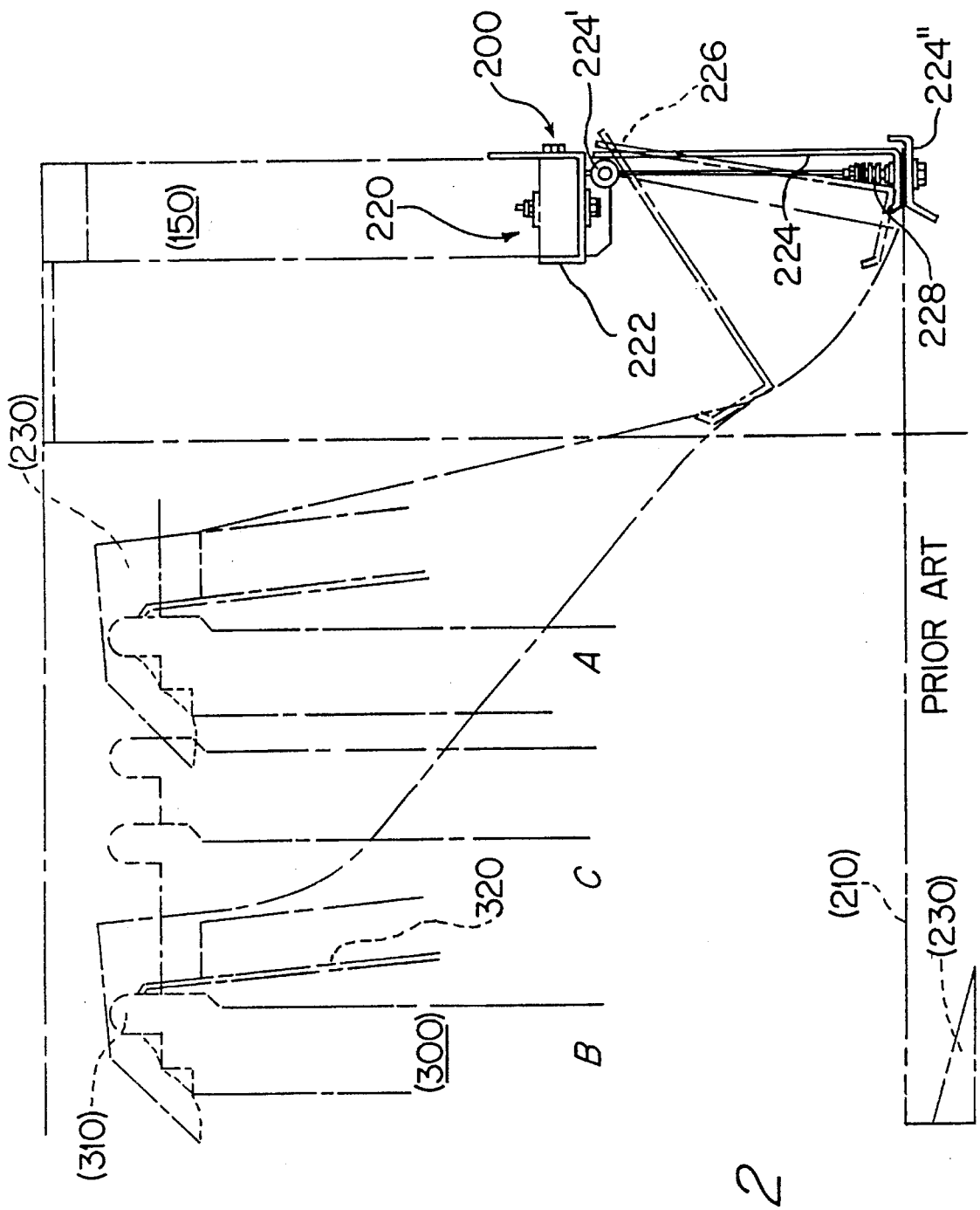
FIG. 2 is a schematic plan view of one prior art curtain assembly, depicting both operative and inoperative modes thereof.
Figure 3:
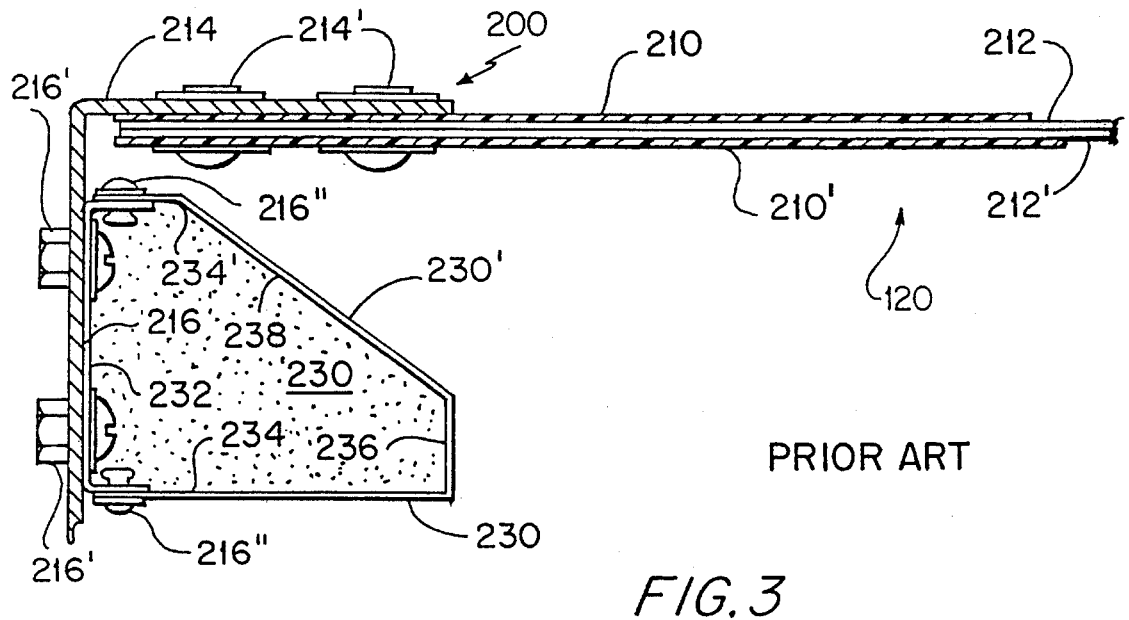
FIG. 3 is an enlarged partial view in section depicting one unit of the FIG. 2 prior art assembly, reference lines 3—3 of FIG. 1.

Referring to prior art hinge gap closure 200, and hinge assembly 220, FIG. 3, they comprise opposed curtain elements 210—210' which are made of DYNALON™ side curtain fabric, supported by contiguous contact with transversely pocketed stays 212—212', FIG. 3, which extend from the hinge leaf 224, FIG. 2. On the free end of curtain 210—210', the ends of the side curtain stays 212—212' terminate in contact with a flexible L-shaped angle 214, that angle being riveted to the free end of the curtain assembly 210—210'. Angle 214 extends substantially the entire vertical distance of the side curtain assembly, providing thereby an anchor for coextensive pad support channel member 216. The channel 216 is retained thereupon by plural bolt, lock washer and jam nuts 216'.

Referring again to FIG. 2, prior art hinge assembly 220 is mounted upon side frame front cap, hinge leaf 222, the same being secured to shelter frame 150 at its projecting free end. In this instance a rigid, right side shelter frame and cap are shown in top plan. The side curtain hinge leaf 224 has rotateable cantilever hinge connection with hinge pin 224'. The prior art curtain 210 is thus held at its anchor end between elements 224—224". Torsion spring 226 is set onto the side frame front cap 222, such that its engagement by the hinge leaf 224 will resist clock-wise movement as the assemblies 210-220-230 are activated by the truck/trailer reversibly moving into docking position, as indicated in FIG. 2. A closing rebound effect upon the assembly will occur upon truck forward release of the closure 200.

At the free end of each prior art curtain element 210 is vertically extending angle 214. See rivets 214' of FIG. 3, binding the curtain and its stays 212—212' together. Channel 216 is compressibly secured to angle member 214 by means of the combination screw, washer, nut arrangements 216', whereas appropriate aluminum pop rivets 216" secure the cover and core to the channel anchor plate 216, as shown in FIG. 3. Secured to channel 216 by rivets 216", is prior art closure pad 230, preferably formed of polyurethane foam. This five-walled pad extends vertically at the terminus of the curtain assembly 210 and is partially coextensive with the height thereof. Contiguous to channel member 216 is anchor wall 232 of pad column 230, joined at a right angle to pad intermediate wall 234, which in turn is joined at another right angle by the shorter connecting wall 236, said connecting wall being parallel to anchor wall 232. Angularly offset from the connecting wall 236 is truck hinge striker wall 238, which in turn joins at an obtuse angle, intermediate wall 234'. This wall 234' is parallel to its counterpart, intermediate wall 234 and connects at a right angle to the anchor wall 232. Both intermediate walls 234 and 234' are penetrated by multiple pop rivets 216" which are in vertical alignment with the center of parallel channel 216 extensions. These extensions are normal to the angle member 214. The entire pad column is bounded on its five sides by a DYNAFLEX™ cover 230' which conforms to exposed exterior walls of the pad core. Pad walls 232, 234 and 234', are encompassed by U-shaped channel and anchor plate 216, retaining the anchor portion of the pad core 230 against displacement during its forcible transition from inactive to active position by virtue of sliding contact of the truck/trailer hinge with the walls 234, 236 and 238, in that order.

In FIG. 2, the basic operative function of a prior art righthand side curtain assembly 200 appears, schematically. To depict the function more realistically, one must consider whether or not the truck/trailer 200 may be centered in the dock or out of position, viz., to the right or to the left of dock center. It will be apparent that when the trailer is out of position to the right, the gap angle between moveable hinge leaf and shelter side wall projection is small; whereas, when the trailer is out of position to the left, the angle between moveable hinge leaf and shelter is comparatively greater. See FIG. 2. The exact opposite effect will occur as a lefthand closure assembly is displaced.

More specifically, as vehicle 300, having hinge 310 and door 320 has been backed into docking position A, it is offset to the right of dock center positions C. The two positions, A & B, represent the displacement of a narrower trailer to the left and a wider trailer to the right. In accordance with customary misjudgment, the spring-biased hinge assembly 200 with its curtain 210 is now positioned with the truck hinge upon seal 230 into this alternate impinging position A. The truck/trailer 300 is out of position to the right. Here the actuation of hinge is lesser, when compared to the position B wherein vehicle 300, its hinge 310 and door 320 are offset to left of the dock center positions C.

To iterate, as the hinge assembly 200 responds to vehicular pull on the curtain, the trailer being out of position to the right of dock center, the leaf component 224 moves arcuately inwardly. Its extensions are pushed from the position of repose into that shown as the intermediate position on the schematic diagram of FIG. 2. On the contrary, as the truck/trailer may move out of position to the left of dock center, the leaf of the hinge is pulled to the extreme upper position, whereby the gap between truck and dock door is filled, by gap pad (230). By virtue of the extension-compression characteristic of the respective hinge and its torsion spring, these elements, when released will move back to the position of repose first shown and described, relative to the shelter side frame 150 viz., the inoperative position. These gap closing functions of prior art curtain 220 and seal 230 are clearly depicted in the respective positions A-B-C illustrated in FIG. 2.

Figure 4:
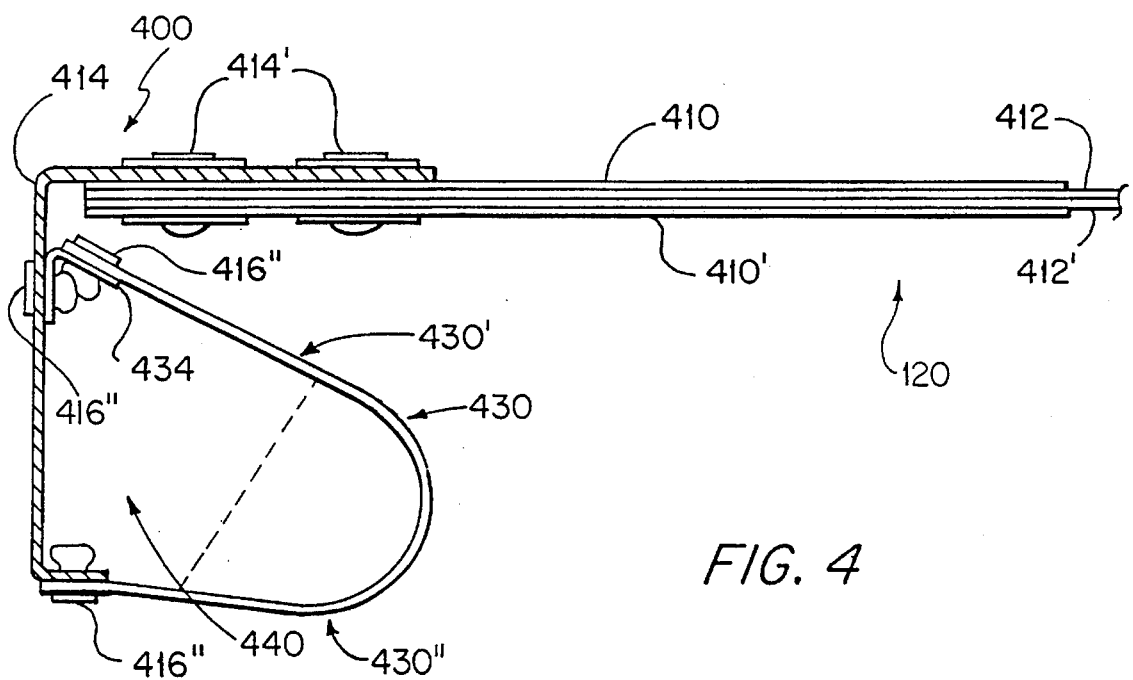
FIG. 4 is an enlarged, partial and horizontal section view of one curtain assembly according to the invention. This side curtain assembly view is taken along the lines 4—4 of FIG. 5.
Figure 5:
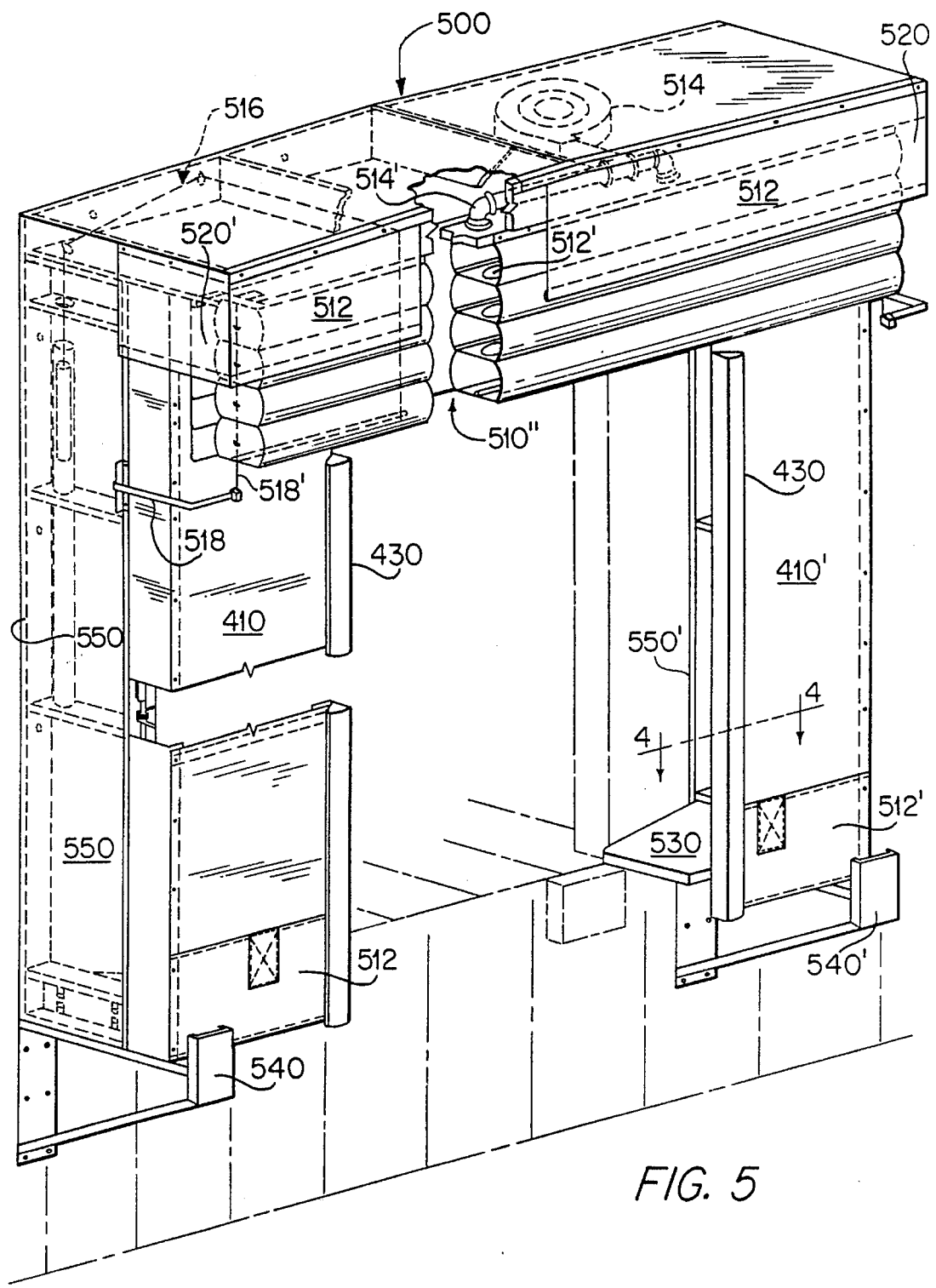
FIG. 5 is a view in perspective of the dock shelter of the invention with curtain assemblies of the type shown in FIG. 4, as well as a head bag sealing assembly.

Referring to the present improvement invention, of FIG. 4 and FIG. 5, the free end of closure extension 400 is shown. Whereas a single righthand closure assembly 200 and closure extension 400 are each depicted, opposed righthand and lefthand mirror image closures and extensions are required to close the gap between the respective sides of the open truck door and the dock door, reference FIG. 1 and FIG. 5. It is anchored forwardly of the curtain, 410—410' to present striking and holding surfaces for the open hinge/door. This comprises essentially the same type of assembly of the prior art device of FIG. 3, aforesaid. The curtain is reinforced by transverse stays 412—412'. In both closure extension assemblies 200/400, the rigid side frames 150—150' are vertically hinged on their distal ends, whereby respective attached hinge leafs are rotateable toward the inside of the shelter and spring-biased toward alignment with the proximal fixed portion of respective side frames. As in FIG. 4, the improvement herein is best shown by the section view taken along the lines 4—4 of FIG. 5. Here, connector 434 is resiliently secured to the free end of angle member 414 by means of appropriate aluminum pop rivets 416". Aluminum pop rivets 416" also secure free ends of a compressible weather seal to the connector 434 and angle member 414, as shown. Each of two compressible closure seals 430—430' is preferably formed of thick fabric supported rubber sheeting, bent upon itself. It is resiliently anchored by angle member extension 414 to the forward face of the side curtain assembly 410—410' consisting of fabric supported sheetings. The horizontal cross-section profile of the seal 430 defines a U-shape, wherein the inner leg, adjacent the curtain, is longer than the outer leg. The inner leg of the seal forms the truck hinge striker wall 430', whereas the shorter, outer leg 430" is offset forwardly therefrom. This closure seal also extends vertically at the terminus or free end of the curtain assembly 410—410', being likewise coextensive with the height thereof. An appropriate number of in-line fasteners 416" secure opposite ends of the seal to the connector 434 anti to the free end of the angle 414. Offset inwardly from angle 414 is truck hinge striker wall 430'. This inner wall 430' is secured at an acute angle to the anchor element 414, as shown and connects at its opposite, outer end 430" at a right angle, relative to the resilient extension element 414. Both seal walls 430' and 430" are penetrated by multiple pop rivets 416" which are in vertical alignment with the center of the connector 434 and the opposed end of angle element 414. Seal walls 430' and 430" form, with intermediate bend, a U-shaped cross section which is fixed at ends against displacement during forceful transition from inactive to active position by virtue of sliding contact of the truck/trailer hinge with the walls 430"—430", in that order. Depression of the seal 430 is comparable to that shown in the prior art pad 230 of FIG. 2. Optionally, the closure seals may comprise encapsulating resilient closure members, the interior 440 of which includes a compressible insulation. The function of a lefthand closure 200 is a mirror image duplicate of the function of the righthand closure of FIG. 4.

FIG. 5 illustrates the modified dock shelter unit 500. Side curtains 410—410' are anchored to side frames 550—550', respectively. The top of the unit supports an inflatable head bag assembly 510" which, upon inflation, reacts in a downward movement to create a seal against the top of a docked truck/trailer.

When inactive, the bag assembly includes multiple compartments 512 which are collapsed and secured to a transverse head frame, between the front head curtain 520 and its counterpart rear head curtain 520', air piping and blower assembly 514, supported under the headframe of the unit via conduit 514' serves to simultaneously inflate the head bag compartments 512 after docking and upon activation of the blower. See aligned openings 512'. As an integral part of the head bag assembly, a pulley system 516 including a counterweight is housed within the rigid side frame 550. An appropriate head bag bracket 518 is secured to the side frame, whereby its guide wire 518' stabilizes the head bag against lateral displacement, during transition from collapsed to inflated mode. A copy thereof appears on the right hand of the head bag. In this advanced configuration of dock shelter 500, the curtain assembly 410—410' is likewise encased by a resilient bottom pad 530 which is deformed by compression of the vehicle against bottom reinforcement 512—512' of the side curtain 410. The side curtains in this assembly are vertically hinged to the side frame in substantially the same manner as in the FIG. 2 prior art configuration 200. Suitable steel guards 540—540' are anchored to the dock face in partial support of the side frames and the overall hinge gap closure assembly 500.

Whereas the invention has been defined with reference to prior art drawings and specification, it is limited by the scope of the annexed claims, only.

We claim:

1. A storage terminal having a combination of a dock and a truck shelter wherein opposed rigid shelter side frames project from the dock, opposed mirror image shelter side curtain assemblies for truck hinge gap closure, attached to said rigid shelter side frames comprising:

a) opposed and mirror image truck hinge units, each unit comprising an elongated single leaf hinge, the hinge being fixed and anchored to the outer extremity of the rigid shelter side frame, said hinge unit being restrained by torsion extension-compression means, said hinge having curtain clamping means on a free end of each unit;

b) a reinforced side curtain clamped at a proximal end thereof to the hinge, said side curtain being laterally reinforced by transversely disposed stays and longitudinally reinforced by at least one vertically disposed stay;

c) a compressible hinge gap side frame weather seal, resiliently attached to a distal end of each said side curtain, said seal comprising an elongated, tubular member, formed of a fabric supported sheet which in horizontal cross-section defines a substantially continuous unbroken curved line which is U-shaped and bent upon itself, an inner unbroken leg of the seal being longer than an outer leg thereof, elongated sides of the seal being anchored to a resilient extension of the distal end of the side curtain;

d) an inflatable head bag assembly anchored to a shelter above and between the side frames thereof, whereby upon induced compression from the truck, the head bag assembly reacts in a downward movement to create a complemental seal against the top of the truck.

2. The storage terminal of claim 1 wherein the inflatable head bag assembly comprises multiple, transversely extending superposed compartments, said compartments depending from the head bag assembly forwardly of respective said side frames, thereby engaging a roof of the truck and coactively sealing it, together with the sealing effect of each said side curtain hinge gap weather side frame seal.

3. The storage terminal of claim 1 wherein the weather seals, resiliently attached to the distal end of each side curtain, comprise encapsulating resilient closure members, the interior of which includes a compressible insulation.

\* \* \* \* \*